Patented Oct. 23, 1934

1,978,010

UNITED STATES PATENT OFFICE 1,978,010

DEWAXING OF OIL

Paul Johnson Carlisle, Niagara Falls, N. Y., assignor, by mesne assignments, to E. I. du Pont de Nemours and Company, a corporation of Delaware No Drawing. Application September 15, 1931, Serial No. 563,002

10 Claims. (Cl. 196—19)

This invention relates to the treatment of hydrocarbon materials containing wax and more particularly to the dewaxing of mineral oils.

Paraffin wax, which may be defined as a mixture of hydrocarbons of the paraffin series, solid at ordinary temperatures, is often obtained by dewaxing hydrocarbon oils. The procedure generally used is to add to the oil-wax mixture a dewaxing solvent or solvent mixture in which the oil is very soluble, and the wax is but slightly soluble. The resulting mixture is then cooled to some low temperature and the wax removed by filtration or centrifuging.

Isopropyl and butyl alcohol, acetone, isopropyl ether, or mixtures of these with benzol or naphtha have been suggested as solvents to replace naphtha. Many of these solvents or mixtures of solvents are capable of separating wax from oil at relatively high temperatures. However, under these conditions the solubility of the oil is so low that a very large volume of solvent per unit volume of oil is necessary in order to obtain satisfactory separation of the oil and wax. Solvents such as benzene or naphtha are miscible with oil but require very low chilling temperatures such as —60° F. to —70° F. to effectively remove the wax and produce low pour point oils. This procedure is also objectionable because the wax precipitate produced is generally amorphous and difficult to remove from the oil and solvent by filtration and other operations involving sweating, which includes heating, standing, cooling and refiltering this wax-oil mixture which may have retained about 50% of oil, and repeating operations until the desired separation is obtained.

Certain chlorohydrocarbon solvents among which are ethylene chloride and trichlorethylene alone or in conjunction with other solvents, have also been proposed as solvents. These chlorohydrocarbons as heretofore tried have not been considered satisfactory because oils treated with them tend to darken in storage.

An object of this invention is to provide a process for preparing low cold test lubricating oils from cylinder stocks, lubricating distillates and the like of higher cold test using substantially higher chilling temperatures than those generally employed in present practice. A further object is to obtain a sufficiently distinct separation of wax from the oil to give a high yield of low cold test oil and commercially usable wax without resorting to the slow and complicated fractional melting or sweating operations now in use. A still further object is to provide a process whereby very low cold test oils can be produced efficiently and economically from lubricating distillates. Other objects will appear hereinafter.

These objects are accomplished by mixing the wax-bearing oil with methylene chloride $(CH_2Cl_2)$, alone or in mixture with other wax solvents, subjecting the mixture to moderately low temperatures and removing wax precipitate from the oil-methylene chloride mixture.

In one method of carrying out my invention, the methylene chloride is mixed with the oil, for example, in the proportion of 50–80% methylene chloride to 50–20% by volume of oil. The mixture is then chilled to a temperature of 32° F. or lower and the wax precipitate removed from the oil-solvent mixture for instance by filtration at the chilling temperature. The wax is precipitated in a substantially crystalline form, making possible a practically complete separation of wax and oil-solvent mixture in a single operation, for example, by filtration. The methylene chloride may then be removed from the oil for instance by simple distillation, steam distillation, or air blowing, followed by recovery of the methylene chloride by any suitable means.

Examples

1. A lubricating distillate having a specific gravity of 0.852 and a pour point of 70° F. was mixed with methylene chloride in the proportion of 1 volume of oil to 1 volume of methylene chloride. The mixture was cooled to —13° F. at the rate of 18° F. per hr. and filtered after standing at —13° F. for one hour. The wax obtained by filtration was white and contained 11% of oil. After removal of the methylene chloride by distillation in a current of dry air, the pour point of the filtered oil was found to be —5° F. The oil showed no discoloration by this treatment nor was there any evidence of discoloration after continued standing. A sample of lubricating distillate treated in the same manner with four volumes of naphtha yielded an oil having a pour point of +25° C.

2. One volume of the oil of Example 1 was dissolved in 2 volumes of methylene chloride and dewaxed as described in Example 1. The dewaxed oil had a pour point of —5° F. The wax residue, after washing at —13° F. with two volumes of methylene chloride to displace the solvent and oil in the cake, had a melting point of 108° F. It was white and crystalline and contained 3% of oil.

3. One volume of the oil of Example 1 was dissolved in 2 volumes of methylene chloride and chilled at the rate of 18° F. per hour to −40° F. The wax precipitate was crystalline and was readily removed by filtration, giving a white product containing approximately 11% oil. After removal of the solvent by distillation in a stream of air the oil had a pour point lower than −40° F.

4. One volume of a cylinder stock having a gravity of 29.5 A. P. I., a pour point of 90° F., and a viscosity of 98 seconds S. U. V. at 210° F. was dissolved in 2 volumes of methylene chloride and chilled at the rate of 18° F. per hour to −13° F. After standing at −13° F. for 1 hour, the wax precipitate was removed by filtration. Upon removing the solvent by distillation in a stream of nitrogen the oil was found to have a pour point of 0° F. The wax was crystalline and brown in color.

5. One volume of long residuum was dissolved in two volumes of naphtha, having a flash point of 115° F. and a boiling point of 154–201° C. and cooled to −13° F. The filtrate became cloudy, indicating the presence of amorphous wax. This wax was so finely divided that it could not be separated from the oil by filtration.

One volume of this long residuum was dissolved in two volumes of methylene chloride and chilled to −13° F. A brown crystalline wax was precipitated which was easily removed by filtration. The pour point of the dewaxed oil was 0° F.

While methylene chloride alone is particularly effective for removing wax from oil, it may also be used in admixture with other commonly employed organic wax solvents. For example, mixtures of methylene chloride with acetone, butanol, benzol or naphtha are suitable. Varied proportions of methylene chloride may be employed in the solvent mixture. Satisfactory results have also been obtained by using varied ratios of solvent to oil, for example, 1 to 4 parts solvent to 1 part oil.

If satisfactorily conducted, my separation of oil and wax will enable one to recover a good grade wax in one operation. If however, a further removal of oil from wax is desirable, I have found that washing or recrystallizing this wax with methylene chloride alone or admixed as stated above, will effect any further desired separation. The following examples will further illustrate the invention:

6. One liter of long residuum with a pour point of 90° F. was dissolved in a mixture of 1.6 liters of methylene chloride and 0.4 liter of acetone. This mixture was allowed to cool at a rate of 18° F. an hour until the temperature of −13° F. was reached. It was allowed to stand for one hour and then filtered. The wax removed was brown and crystalline at the dewaxing temperature. The dewaxing solvent mixture was removed from the oil by distillation at 176° F. in a current of air. The resulting oil showed no signs of discoloration. It had a pour point of −15° F.

7. One liter of the long residuum of Example 6 was treated with a mixture of one liter of methylene chloride and one liter of butanol. This mixture was allowed to cool at a rate of 18° F. an hour to −13° F. and then allowed to stand one hour at this temperature. The wax, which was brown and crystalline, was then filtered off and found to contain 12% oil. The dewaxing solvent was then removed by distillation at 176° F. in a current of dry nitrogen. The resulting oil had a pour point of −10° F.

8. One liter of wax distillate was dissolved in a mixture of 1.6 liters of methylene chloride and 2.4 liters of acetone. This mixture was allowed to cool at the rate of 18° F. an hour to −13° F. The wax, which was immediately filtered off, was white and crystalline and had a melting point of 103° F. The dewaxing solvent was then removed by distillation at 80° C. in a current of air. The resulting oil had a pour point of −25° F.

This invention is not limited to any particular type of materials but is generally applicable to removal or recovery of petrolatum or wax from mineral oils such as wax distillates, long residuums, lubricating oils and the like by filtration, cold settling, centrifuging, or other means. It is likewise not limited to specific solvent-oil ratios, chilling temperatures, and chilling rates, since these are dependent upon the character of the wax-bearing oil.

My invention has many advantages over prior methods. One advantage is that by the use of my invention, low cold test oils can be obtained without resorting to the low temperatures necessary with solvents such as naphtha. The relative amount of solvents such as acetone, butanol, or ethylene dichloride required for dewaxing, is very much greater than is necessary with methylene chloride.

Another important advantage is that a sharp separation of oil and wax can be obtained in one operation, thus insuring a high yield of dewaxed oil and the direct production of a salable, crystalline wax without resorting to the slow and cumbersome sweating operation now in use for recovering oil and high grade wax from the wax precipitate. Another important advantage resides in the fact that the wax precipitate obtained in my process is crystalline and can be filtered much more readily than the amorphous wax obtained for instance from naphtha solutions. Still further advantages of methylene chloride over other solvents for dewaxing lie in its non-inflammability, high specific gravity, inertness toward oil, and non-corrosiveness to metals. Mixtures containing methylene chloride and other solvents as indicated above possess similar advantages and are cheaper than methylene chloride alone.

To avoid undue multiplicity of claims, I intend the term "methylene chloride" to cover this material either when used alone or when used in substantial and effective quantities in admixture in varying proportions with other suitable solvents as hereinbefore indicated.

I claim:

1. A process for separating the oil and wax in a wax-oil mixture comprising dissolving methylene chloride therein, cooling the wax-oil-methylene chloride mixture to cause the precipitation of the wax, and thereafter separating the precipitated wax.

2. A process for separating the oil and wax in a wax-oil mixture comprising dissolving methylene chloride therein, chilling the wax-oil-methylene chloride mixture to a temperature below 32° Fahrenheit to precipitate the wax, and thereafter removing the precipitated wax from the mixture.

3. A process for separating the oil and wax in a wax-oil mixture comprising dissolving methylene chloride therein, chilling the wax-oil-methylene chloride mixture to a temperature below 32° Fahrenheit to precipitate the wax, removing the wax and washing said wax with methylene chloride.

4. Process for treating wax-oil mixtures comprising mixing 1 to 4 volumes of methylene chloride with 1 volume of said mixture, chilling the mixture to a temperature below 32° F. and filtering precipitated wax from the mixture.

5. Process for treating wax-oil mixtures comprising mixing 1 to 4 volumes of methylene chloride with 1 volume of said mixture, chilling the mixture to a temperature below 0° F. and filtering precipitated wax from the mixture.

6. In a method for the purification of wax containing oil as the principal impurity, the step of adding methylene chloride to said wax and cooling to a temperature below 32° F. and removing the methylene chloride solution, in order to remove therefrom the impurities soluble in methylene chloride.

7. In a process of wax removal from a mineral oil-wax mixture utilizing methylene chloride as a dewaxing agent, the step comprising washing the precipitated wax with further amounts of methylene chloride.

8. The process for separating the oil and wax in a wax-oil mixture comprising adding methylene chloride to the wax-oil mixture, cooling the wax-oil-methylene chloride mixture to a temperature below 32° Fahrenheit to precipitate the wax, removing the precipitated wax from the mixture and thereafter separating the methylene chloride from the oil.

9. The process for separating the oil and wax in a wax-oil mixture comprising dissolving methylene chloride therein, cooling the wax-oil-methylene chloride mixture to a temperature below 32° Fahrenheit to cause precipitation of the wax, removing the precipitated wax and washing said wax with methylene chloride and thereafter separating the methylene chloride from the oil.

10. Process for treating wax-oil mixtures comprising mixing 1 to 4 volumes of methylene chloride with 1 volume of said mixture, chilling the mixture to a temperature below 0° F., and filtering precipitated wax from the mixture and thereafter separating the methylene chloride and oil.

PAUL JOHNSON CARLISLE.